US012359600B2

(12) United States Patent
Riddle, II et al.

(10) Patent No.: US 12,359,600 B2
(45) Date of Patent: Jul. 15, 2025

(54) EXHAUST AFTERTREATMENT APPARATUS (71) Applicant: Purem Novi, Inc., Brighton, MI (US)

(72) Inventors: Jack Riddle, II, Brighton, MI (US); Lisa Robins, Brighton, MI (US); Yan Shu, Brighton, MI (US); John Padalis, Brighton, MI (US); Gary McKissick, Brighton, MI (US); Hyde Kani, Brighton, MI (US)

(73) Assignee: PUREM NOVI, INC., Novi, MI (US)

( * ) Notice: Subject to any disclaimer, the term of this patent is extended or adjusted under 35 U.S.C. 154(b) by 0 days.

(21) Appl. No.: 18/547,049

(22) PCT Filed: Feb. 18, 2022

(86) PCT No.: PCT/US2022/016945
§ 371 (c)(1),
(2) Date: Aug. 18, 2023

(87) PCT Pub. No.: WO2022/178231
PCT Pub. Date: Aug. 25, 2022

(65) Prior Publication Data
US 2024/0309789 A1    Sep. 19, 2024

Related U.S. Application Data (60) Provisional application No. 63/151,390, filed on Feb. 19, 2021.

(51) Int. Cl.
*F01N 3/28* (2006.01)
*F01N 3/20* (2006.01)

(52) U.S. Cl.
CPC ......... *F01N 3/2892* (2013.01); *F01N 3/2066* (2013.01); *F01N 2240/20* (2013.01); *F01N 2470/02* (2013.01); *F01N 2610/1453* (2013.01)

(58) Field of Classification Search
CPC ...... F01N 3/2892; F01N 3/2066; F01N 3/206; F01N 3/021; F01N 3/10;
(Continued)

(56) References Cited

U.S. PATENT DOCUMENTS 7,814,745 B2    10/2010  Levin et al.
8,240,137 B2 *  8/2012   Liu .................... B01F 25/4315
                                                            239/433

(Continued)

FOREIGN PATENT DOCUMENTS

CN    111927603 A      11/2020
DE    102016104361.3 A1  3/2016
WO    2019/055922 A1    3/2019

OTHER PUBLICATIONS

International Search Report and Written Opinion dated Jun. 3, 2022, Application No. PCT/US2022/016945.

(Continued)

Primary Examiner — Kenneth J Hansen
Assistant Examiner — Kelsey L Stanek
(74) Attorney, Agent, or Firm — The Dobrusin Law Firm, P.C.; Daniela M. Thompson-Walters (57) ABSTRACT An exhaust aftertreatment apparatus comprising: a) a reactor portion which is tubular and has a flow axis parallel with its longitudinal axis, wherein the reactor portion is configured to receive an exhaust stream in a first end region; b) a mixer located within the reactor portion and located downstream of the first end region, wherein the mixer includes at least a portion of a mixing tube which extends at an angle transverse to the longitudinal axis of the reactor portion; c) an outer tube located about at least a portion of the mixing tube and projecting from an exterior of the reactor portion; and d) an injector in fluid communication with the outer tube and the mixing tube and distanced from the reactor portion, (Continued)

wherein the injector is configured to spray a reductant toward the outer tube and the mixing tube.

20 Claims, 5 Drawing Sheets

(58) Field of Classification Search
CPC ......... F01N 2610/1453; F01N 2610/02; F01N 2610/03; F01N 2470/02; F01N 2470/04; F01N 2240/20
USPC .......................................................... 422/168
See application file for complete search history.

(56) References Cited

U.S. PATENT DOCUMENTS

| | | |
|---|---|---|
| 8,336,301 B2 | 12/2012 | Werni |
| 8,495,866 B2 | 7/2013 | Wirth |
| 8,635,858 B2 | 1/2014 | Levin et al. |
| 8,763,375 B2 | 7/2014 | Wieland |
| 9,074,522 B2 | 7/2015 | Scholt |
| 9,188,039 B2 | 11/2015 | Nagel |
| 9,334,785 B2 | 5/2016 | Marquardt-Stammberger |
| 10,100,706 B2 | 10/2018 | Zhang et al. |
| 10,208,645 B2 * | 2/2019 | Gehrlein ............... F01N 3/2892 |
| 10,215,076 B2 | 2/2019 | Solipuram et al. |
| 10,512,442 B2 | 12/2019 | Inoue |
| 2008/0267780 A1 | 10/2008 | Wirth |
| 2015/0110681 A1 | 4/2015 | Ferront |
| 2016/0215673 A1 * | 7/2016 | Noren, IV .......... B01F 25/4521 |
| 2019/0211733 A1 | 7/2019 | Noren, IV et al. |
| 2019/0383194 A1 | 12/2019 | Tummala et al. |
| 2020/0131969 A1 | 4/2020 | Tucker et al. |

OTHER PUBLICATIONS

Sun, Ke, Zhao, Haiyang et al., Optimization of SCR inflow uniformity based on CFD simulation, De Gruyter, Open Physics 2020, 1168-1177.

* cited by examiner

Section A-A

*FIG-9*

EXHAUST AFTERTREATMENT APPARATUS

FIELD

The present teachings relate to an exhaust system. The exhaust system may find particular use in combination with an internal combustion engine, such as that of a transportation vehicle. The present teachings may relate to an exhaust aftertreatment apparatus. The present teachings may find particular use in uniformly mixing a reductant into an exhaust stream within limited space constraints.

BACKGROUND

Generally, internal combustion engines produce an exhaust stream having toxic gases and pollutants within the exhaust stream. Agencies across the world, such as the United States Environmental Protection Agency, have enacted regulations regarding the exhaust emissions, seeking to reduce the toxic gasses and pollutants. It is now typical that transportation vehicles (e.g., commercial vehicles, such as trucks) are equipped with exhaust aftertreatment systems configured to remove or reduce the toxic gasses and pollutants within the exhaust stream prior to emission of the exhaust stream to the atmosphere.

In efforts to meet stringent emission requirements, it has become common to perform one or a series of chemical reactions within the exhaust system. For example, it is common to employ a direct oxidation catalytic ("DOC") reaction. That reaction is employed to breakdown undesirable hydrocarbons in an exhaust stream into carbon dioxide and water reaction products. It is also common to perform selective catalytic reduction ("SCR"). That reaction typically seeks to convert (by a reduction reaction) one or more nitrogen oxides found in an exhaust stream into benign nitrogen gas and water. There may be employed one or more thermolytic and/or hydrolytic steps by which some or all of the nitrogen oxides present are reacted with reductant (e.g., urea) (provided in micro-droplets) to form an ammonia intermediate product that is thereafter reduced to nitrogen gas and water. Additionally, it is common to perform a separation step for removing particulate combustion products, such as by a filtration process. As a result of the various chemical reactions, a typical exhaust system is required to effectively function as a chemical reaction system, pursuant to which each of the chemical reactions is performed in a portion ("reactor portion") of the after-treatment system. Separation(s) may be performed within a reactor portion or within a separate portion.

One challenge presented by known exhaust after-treatment systems is the overall space required to integrate the exhaust system into a transportation vehicle. For some applications, for instance, "in-line" exhaust after-treatment systems will incorporate each of the reactor portions and a filter serially in a generally straight exhaust stream flow path configuration. To achieve such functionality, along with the straight flow path of the exhaust stream, it may necessarily require that the system extend along almost an entire length of a vehicle from a motor to the rear of the vehicle. This can become complex in integrating the exhaust after-treatment system with other vehicle components (e.g., brake lines, fuel tank, fuel lines, suspension system, electrical wiring, etc.) or cargo storage areas (such as the case with heavy duty trucks). One effort to integrate exhaust after-treatment systems while overcoming challenges associated with space constraints has been separating the system into modular reactor portions which are in fluid communication and remotely spaced from one another in the transportation vehicle. These modular systems have been used in vocational transportation vehicles (e.g., dump trucks, cement mixer trucks, garbage trucks, etc.). In another effort to overcome the space constraints associated with the in-line exhaust systems, box-style exhaust systems have been recently integrated into transportation vehicles.

As gleaned from the above, reactor portions in exhaust systems typically employ a catalyst which reacts with the exhaust stream passing therethrough. The employment of catalysts tends to be dimensionally dependent (e.g., length, width, height, area and/or volume dependent), as well as possibly being temperature dependent in order that chemical reactants be sufficiently exposed to a catalyst at a desired reaction temperature to achieve the desired reaction. For example, successful reduction of nitrogen oxides often requires that a stream of a reductant (e.g., urea) be injected and mixed with an exhaust stream. Successful mixing within a short exhaust stream flow path length has posed technical challenges. Accordingly, achieving the potentially multiple objectives for a successful mixing and/or chemical reactions within a compact packaging space has produced various competing technical challenges.

Box-style exhaust systems have been known to employ tube mixers. In such tube mixers, a reductant and exhaust stream flow direction are typically parallel to one another such that the reductant mixes with the exhaust stream in its natural flow bath. One such tube mixer is taught in "Optimization of SCR Inflow Uniformity Based on CFD Simulation" available at https://www.degruyter.com/document/doi/10.1515/phys-2020-0221/html. While this tube mixer may be useful in a box-style application, it does not provide an effective solution in an in-line exhaust in which the exhaust stream follows a single linear path.

In-line exhaust systems are known to employ mixing baffles which are downstream of a reductant input. One exemplary solution for reducing the overall length of an exhaust is the use of an atomizer downstream from the reductant input, such as taught in U.S. Pat. No. 8,635,858. The Applicant provides for an elegant solution to further reduce an exhaust length by providing a tunnel mixer which can be in direct fluid communication with an injector of a reductant. Such a tunnel mixer can be found at https://www.autocarpro.in/news-international/eberspaecher-starts-tunnel-mixers-exhaust-emission-conversion-pvs-cvs-28651 and in PCT Publication No. WO 2019/055922, which is incorporated herein by reference in its entirety. Notwithstanding, there are still challenges associated with reducing overall packaging space and providing for uniform mixing of a reductant with an exhaust stream over a shorter length of an in-line exhaust or that can even be employed in a box-style exhaust system.

SUMMARY

The present disclosure relates to an exhaust aftertreatment apparatus comprising: a) a reactor portion which is tubular and has a flow axis parallel with its longitudinal axis, wherein the reactor portion is configured to receive an exhaust stream in a first end region; b) a mixer located within the reactor portion and located downstream of the first end region, wherein the mixer includes at least a portion of a mixing tube which extends at an angle transverse to the longitudinal axis of the reactor portion; c) an outer tube located about at least a portion of the mixing tube and projecting from an exterior of the reactor portion; and d) an injector in fluid communication with the outer tube and the mixing tube and distanced from the reactor portion, wherein the injector is configured to spray a reductant toward the outer tube and the mixing tube.

The present disclosure relates to a method of using an exhaust aftertreatment apparatus according to the teachings herein.

The present disclosure further relates to a method for treating an exhaust stream resulting from internal combustion of a transportation vehicle comprising: a) flowing an untreated exhaust stream through a reactor portion such that a direction of the untreated exhaust stream is substantially parallel to a longitudinal axis of the reactor portion; b) diverting a portion of the untreated exhaust stream transverse to the longitudinal axis and through a mixing tube aperture such that the portion of the untreated exhaust stream exits the reactor portion; c) passing the portion of the untreated exhaust stream through a gap between a mixing tube and an outer tube; d) passing the portion of the untreated exhaust stream through a swirler causing a turbulent flow after exiting the gap; e) spraying a reductant from an injector into the portion of the untreated exhaust stream; f) mixing the reductant with the turbulent flow of the untreated exhaust stream and creating a mixed exhaust stream; g) redirecting the mixed exhaust stream to flow through the mixing tube in a substantially opposite and parallel direction as the portion of the untreated exhaust stream; and h) deflecting the mixed exhaust stream to exit the mixing tube.

The present disclosure provides for an exhaust aftertreatment apparatus which may be compatible with both in-line and box-style exhausts. The apparatus provides for a reductant and mixing flow that may be located outside of a reactor portion and then return to a same or differing reactor portion. The apparatus provides a means for creating a mixing region outside of a reactor portion and thus allowing the reactor portion to have a shorter overall length. The apparatus provides an exhaust aftertreatment apparatus which allows for an exhaust stream to flow in two opposing directions within a same tubular portion to encounter and mix with a reductant.

DETAILED DESCRIPTION

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Unless otherwise stated, or clearly understood from the context of its use, reference herein to "exhaust stream" includes the stream of exhaust fluid initially emitted as a combustion reaction product from an engine, as well as any resulting fluid reaction products occasioned by an aftertreatment step as described herein (e.g., a step of a DOC reaction, an SCR reaction, or other reaction, such as a thermolytic and/or hydrolytic reaction). The use of "untreated" may refer to the exhaust stream that has not yet been mixed with and/or reacted with a reductant. The use of "treated" or "mixed" may refer to the exhaust stream that has be mixed with and/or reacted with a reductant.

The teachings herein relate to an apparatus. The apparatus may be particularly useful in treating an exhaust stream. The apparatus may be referred to as an exhaust aftertreatment apparatus. The exhaust stream may be an exhaust resulting from internal combustion. The internal combustion may be from any engine, such as that of a transportation vehicle. Transportation vehicle may include any vehicle suitable for land, water, and/or air transportation. Transportation vehicles suitable for land may include any size truck, bus, car, all-terrain vehicle, rail vehicle, agricultural equipment, construction equipment, etc. Trucks may include light duty, medium duty, heavy duty, vocational trucks, etc. The present teachings may also be used in non-vehicular applications. For example, the teachings herein may be applied to stationary generators, pump stations, industrial power generating operations, etc. The internal combustion may be in a diesel engine, gasoline engine, or the like. The apparatus may receive an exhaust stream from a motor. An exhaust line may carry the exhaust stream away from an internal combustion engine and to an inlet of the apparatus. The apparatus may function to reduce particulate matter and pollutants occurring with the exhaust stream, ensure an emitted exhaust stream meets environmental standards, or both. The apparatus may function reacting with the exhaust stream to collect, remove, reduce, and/or convert particulate matter and pollutants. The apparatus may include a plurality of components to allow the apparatus to function as recited. The components may include one or more pipes, tubes, reactor portions, caps, mixers and/or mixing baffles, mixing tubes, flow diverters, particle filters, catalysts, injectors, the like, or any combination thereof.

The apparatus includes one or more reactor portions. The reactor portions may function to house one or more mixers, react with an exhaust stream, remove particulates from the exhaust stream, house one or more filters, house one or more catalysts, receive one or more reductants, or any combination thereof. The one or more reactor portions may have any suitable size and/or housing a mixer, being in communication with a reductant source, shape for reacting with an exhaust stream passing therethrough, remove particulate matter from the exhaust stream, directing the exhaust stream through a reactor portion and/or apparatus, housing one or more other components, or any combination thereof. The one or more reactor portions may be generally cylindrical, cubed, spherical, coned, prismed, the like, or any combination thereof. One or more reactor portions may have generally the same or a differing shape as one or more other reactor portions. One or more reactor portions may have one or more sidewalls extending from one end to an opposing end. One or more filters, catalysts, and/or mixers may be housed and/or enclosed within the one or more sidewalls. One or more reactor portions may have a generally same or differing length and/or width as one or more other reactor portions. Length may be measured along a flow axis, longitudinal axis, or both of a reactor portion. Width may be measured generally transverse to a flow axis and/or longitudinal axis of a reactor portion. One or more reactor portions may have a width which is substantially continuous. One or more reactor portions may have a width which increases, decreases, or both along a length of the reactor portion. One or more reactor portions may be defined by a first end region and/or first end opposite a second end region and/or second end. One or more reactor portions may include or be attached to one or more caps. One or more reactor portions may be in fluid communication with an inlet pipe, mixing tube, outer tube, mixing tube aperture, other reactor portion(s), the like, or any combination thereof.

The one or more reactor portions may have a longitudinal axis (e.g., flow axis) extending along their respective length. The longitudinal axis may extend from a first end region of a reactor portion to a second end region of a reactor portion. A first end region may include an end (i.e., first end) of a reactor portion. A first end region may be a part of the reactor portion configured to receive an exhaust stream. A second end region may include an opposing end (i.e., second end) of a reactor portion. A second end region may be a part of the reactor portion configured to output an exhaust stream (e.g., downstream of a first end region). The longitudinal axis may be generally concentric or off-center with a cross-sectional area of a reactor portion. For example, a longitudinal axis may be concentric with a diameter of a reactor portion. The longitudinal axis of one or more reactor portions may be generally parallel with, perpendicular to, or any angle therebetween relative to the longitudinal axis of one or more other reactor portions. Generally may mean within about 50, within about 100, or even within about 200 from the values stated. The longitudinal axis of one or more reactor portions may be concentric with, aligned with, un-centered from, off-set from, or any combination thereof relative to one or more other longitudinal axes of one or more other reactor portions. Longitudinal axes which are generally parallel with and off-set from one another may allow for the reactor portions to be consolidated and placed adjacent to one another (e.g., a box-style exhaust system). Longitudinal axes which are generally parallel with and substantially aligned with one another may allow for reactor portions to form an "in-line" exhaust system. A longitudinal axis may define an axis of a Cartesian coordinate system. The longitudinal axis may define an x-axis of each reactor portion. Generally transverse to the x-axis and/or longitudinal axis may be a y-axis and/or a z-axis. The y-axis, z-axis, or both may be located at about a mid-length of a reactor portion. The differing axes may be useful in relating one or more components of the apparatus with one another, an exhaust stream passing through the apparatus, dimensions of one or more components, and the like. A longitudinal axis may be referred to as a flow axis (e.g., with reference to flow through a reactor portion of an exhaust stream). A flow axis may be parallel with a longitudinal axis of a reactor portion.

A flow axis may indicate the direction of flow of an exhaust stream relative to a longitudinal axis, along a length of a reactor portion, along a length of a mixing tube, along a length of an outer tube, along a length of an inlet pipe, or any combination thereof. A flow axis may extend from one end region to an opposing second end region. The flow axis of one or more components may flow in a same direction, transverse direction, and/or opposing direction as the flow axis of one or more other portions.

The apparatus may include one or more flow pipes. The one or more flow pipes may allow the exhaust stream to enter into and/or exit the apparatus, one or more openings, one or more reactor portions, or any combination thereof. The one or more flow pipes may have any suitable size, shape, and/or configuration to function as described. The one or more pipes may be generally cylindrical, cubed, spherical, coned, prismed, the like, or any combination thereof. The one or more pipes may have a cross-section which is generally circular, elliptical, oval, egg-shaped, square, rectangular, triangular, or a combination thereof. A cross-section of a pipe having one shape may expand into a cross-section having a same and/or differing shape. For example, a pipe may have a generally circular cross-section which expands into a generally elliptical cross-section. The cross-section may be taken through a plane perpendicular, parallel, or therebetween relative to flow axis of pipe. The one or more pipes may include one or more inlet pipes, outlet pipes, or any combination thereof. The one or more flow pipes may be in fluid communication with one or more reactor portions. One or more flow pipes may be located toward and/or at one or more first and/or second end regions. The one or more flow pipes may extend from a reactor portion. The one or more flow pipes may extend at an angle relative to a flow axis of a reactor portion. A flow pipe may be parallel, perpendicular, or any angle therebetween relative to a flow axis, longitudinal axis, or both of one or more reactor portions. A flow pipe may be about 0° or greater, about 5° or greater, about 10° or greater, about 25° or greater, or even about 45° or greater relative to a flow axis of a reactor portion. A flow pipe may be about 90° or less, about 85° or less, about 75° or less, or even about 60° or less relative to a flow axis of a reactor portion.

The apparatus may include one or more mixers. The one or more mixers may function to mix a reactant (e.g., reductant) with an exhaust stream, provide a general uniform mixture of a reactant with the exhaust stream prior to entering and/or leaving one or more reactor portions, or both. The one or more mixers may have any size, shape, and or configuration to allow for mixing and/or optimizing a reaction of a reactant with the exhaust stream. The one or more mixers may be static, dynamic, or a combination of both. The one or more mixers may reside within, adjacent to, distanced from, or proximate one or more reactor portions. The one or more mixers may reside in a reactor portion; after a filter and/or catalyst; in-line with, located about, and/or offset with a reactor portion, mixing tube, outer tube, fluid delivery device (e.g., injector); or any combination thereof. The one or more mixers may even include at least a portion of a mixing tube. A portion or all of a mixing tube may be integral with a mixer. The one or more mixers may be downstream, upstream, or both of a first end region of one or more reactor portions. The one or more mixers may reside within a same and/or different reactor portion as a reactor portion in which a reactant is introduced. The one or more mixers may be located in a flow path of a reductant, the exhaust stream, or both. A static mixer may rely on one or more blades, openings, and/or flow paths to create turbulence of the exhaust stream and reactant flowing therethrough. The turbulence may provide for a sufficient amount of intensive mixing to allow for a substantially homogeneous mixture of the reactant and exhaust stream. The one or more mixers may include one or more mixing baffles, swirlers, or both. A mixing baffle may cooperate with a swirler to provide for distribution of one or more reactants, such as a reductant. A swirler may be located between an outer tube and a mixing tube, near and/or adjacent to a fluid delivery device, or both. A swirler may be configured to create a turbulent flow (e.g., vortex). A swirler may receive an exhaust stream therethrough before, during, and/or after it comes in contact with a reductant.

The one or more mixers may be selected for providing a substantially uniform distribution of one or more reactants. For example, uniformity of distribution of a reductant with the exhaust stream. A plurality of mixers may be used in conjunction with one another to provide a substantially uniform distribution of reductant. Uniformity of the reductant may be measured as a percentage, with 100% being perfect uniformity in parts per million values measured at a cross-section transverse to a flow axis. Dispersion may be measured after one or more mixers, such as after a mixing baffle. One or more mixers, singularly or together, may result in uniformity of the reductant with the exhaust stream of about 90% or greater, 92% or greater, 95% or greater, or even about 98% or greater. One or more mixers, singularly or together, may result in uniformity of the reductant with the exhaust stream of about 100% or less, about 99.5% or less, or even about 99% or less.

A static mixer may be a radial blade mixer. A radial blade mixer may have a plurality of blades adjacent to one another in a circumferential direction while leaving free and defining a central core area. For example, a radial blade mixer may have one or more features such as those disclosed in US 20080267780, U.S. Pat. No. 8,495,866, incorporated herein by reference for all purposes. A radial blade mixer may be defined as an impingement mixer. A radial blade mixer may be particularly useful for cooperating with a mixing baffle, mixing tube, outer tube, fluid delivery device, the like, or any combination thereof. A radial blade mixer may find use in creating a turbulent flow of an exhaust stream passing therethrough. A radial blade mixer may create a turbulent flow of an untreated exhaust stream passing therethrough. A mixer may have a shape substantially similar to or differing from a cross-section one or more mixing tubes, outer tubes, or both. The mixer may have a plurality of blades. The plurality of blades may point radially inward, outward, or both. The plurality of blades may be arranged radially within the mixer, about the mixer, or both. The plurality of blades may have an angle of incidence in relation to a flow axis one the mixer. The flow axis of the mixer may be parallel with, perpendicular to, or any angle therebetween relative to one or more flow axes of one or more outer tubes, tube mixers, or both. One or more blades may or may not partially overlap one or more other blades. One or more blades may or may not extend completely toward a flow axis of the mixer. A central core area may be defined by a plurality of blades which do not extend completely toward the flow axis. The central core area may allow for passage of the exhaust stream and/or reductant therethrough. The central core area may house or allow one or more tubes to pass through, such as a mixing tube. For example, the upper portion of the mixing tube may be located within the central core area. A plurality of blades may include two or more sets of blades. The two or more sets of blades may be distanced from one another along the flow axis of a mixer. For example, a first set of a plurality of blades may be located at one end of a mixer and a second set of a plurality of blades may be located at an opposing end of the mixer. For example, both a first and second set of blades may be arranged radially within a mixer and define a central core area. One or more blades may be bifurcated. One or more blades may have one or more bends along a length of each blade. The angle of the bend may be acute, right angle, obtuse or any angle therebetween. The one or more radial blade mixers may be concentric with one or more outer tubes, mixing tubes, or both. The one or more radial mixers may be located between one or more outer tubes, mixing tubes, or both. The one or more radial mixers may be located in a gap between one or more mixing tubes and one or more outer tubes. The one or more radial mixers may be located outside of a reactor portion. The one or more radial mixers may be located near a fluid delivery device, at or near an end of one or more tube mixers and/or outer tubes, or both.

A static mixer may include a non-impingement mixer. The static mixer may be referred to as a mixing baffle. A non-impingement mixer may function to redirect flow of an exhaust stream and/or reductant, convert laminar flow into turbulent flow and/or vice-versa of an exhaust stream and/or reductant, or both. A non-impingement mixer may include two opposing plate-like portions having a mixing tunnel therebetween, the mixer releasing one or more vortexes of an exhaust stream mixed with a reductant. The mixer may have one or more features such as those disclosed in PCT Publication No. WO 2019/055922; US Publication No.: 2015/0110681, U.S. patent application Ser. No. 15/454,215 filed on Mar. 9, 2017, and German Patent Application DE 102016104361.3 filed Mar. 10, 2016, which are incorporated herein in their entirety by reference for all purposes. The static mixer may have any size, shape, and/or configuration to function as recited. The static mixer may have one or more shapes which is generally or at least partially cylindrical, cubed, sphered, coned, prismed, pyramided, the like, or any combination thereof. The static mixer may have a 2-dimensional cross-section shape which is generally or at least partially circular, elliptical, square, triangular, rectangular, the like, or a combination thereof. A cross-section shape may be the shape perpendicular to a flow axis. A static mixer may have a shape similar to or differing from that of one or more reactor portions. The static mixer may be in fluid communication with one or more reactor portions, outer tubs, fluid delivery devices, or a combination thereof. The static mixer may be disposed within, adjacent to, or proximate to one or more reactor portions. The static mixer may be disposed between two or more reactor portions. A static mixer may include at least a portion of a mixing tube, a baffle face, or both. A static mixer may include a plurality of openings.

A static mixer may include and/or be affixed to one or more portions of a mixing tube. The mixing tube may function to distribute a reductant with an exhaust stream, guide an exhaust stream toward a plurality of openings and/or downstream from a reactor portion, or any combination thereof. The mixing tube may be located on any portion of a static mixer that may be aligned with a fluid delivery device. The mixing tube may be centered and/or offset from a center of a static mixer. The mixing tube may be perpendicular, parallel, or an offset angle therebetween from a flow axis of a reductant, reactor portion, outer tube, or combination thereof. The mixing tube may be substantially parallel and in line with a flow axis of a reductant. At least a portion of the mixing tube may extend at an angle transverse to the longitudinal axis of a reactor portion. At least a portion of the mixing tube may extend into/through a reactor portion, outer tube, or both. An exterior periphery of a mixing tube may be distanced from an interior of an outer tube to create a gap. The gap may be in fluid communication with an interior of the reactor portion. The gap may be in fluid communication may be in fluid communication via a mixing tube aperture. The mixing tube may pass through the outer tube to create the gap. The mixing tube may be substantially perpendicular to a flow axis of a reactor portion. One or more portions of a mixing tube may have a height. A height may be measured along a longitudinal axis of the mixing tube, a flow axis of the mixing tube, perpendicular to a flow axis of a reactor portion, or any combination thereof. A height of a mixing tube may be a height of a single portion or a combined height of multiple portions. A height of a mixing tube may be smaller than, equal to, or greater than a height of a reactor portion. For example, an overall mixing tube may have a height greater than a height of a reactor portion such that it protrudes outside of reactor portion while portions of the mixing tube may have a height less than the height of the reactor portion. The mixing tube may include a plurality of openings. The openings may be configured to receive an exhaust stream, release an exhaust stream, allow an exhaust stream to pass therethrough, to any combination thereof.

The mixing tube may include one or more portions. The one or more portions may function to assemble together to form the mixing tube, allow for assembly for a mixing tube which protrudes from the reactor portion, or both. One or more portions may include a lower portion and upper portion. A lower portion may receive and/or be received by an upper portion. One or more portions may be partially or completely housed within a reactor portion. A lower portion may be completely housed within a reactor portion. An upper portion may be partially housed within a reactor portion and may be partially located outside of a reactor portion. One or more portions may extend through one or more apertures. An upper portion may extend through a mixing tube aperture such that a segment of the upper portion is located within the reactor portion and a segment of the upper portion is located outside of the reactor portion. The one or more portions may have a shape which is partially or substantially a cylinder, cube, prism, pyramid, sphere, cone, ellipsoid, ovoid, the like, or a combination thereof. The one or more portions may have a cross-sectional shape which is partially or substantially circular, rectangular, triangular, ovular, squared, rhombused, oblong (e.g., rounded rectangle), the like, or any combination thereof. A cross-sectional shape may be taken perpendicular to a flow axis of the mixing tube. For example, a first portion may have a substantially oblong cross-section along its entire length. For example, a second portion may have a substantially oblong cross-section where it mates with the first portion and the oblong cross-section may transition to a circular cross-section opposite the first portion. The one or more portions may include one or more openings in one or more sidewalls, may be solid in one or more sidewalls, or both.

A static mixer may include a baffle face. A baffle face may function to guide a flow of the exhaust stream through a reactor portion, into a mixing tube, toward an outer tube, toward an aperture, or any combination thereof. A baffle face may be located at least partially about a mixing tube (e.g., at least partially surround). A baffle face may be located at least partially adjacent to a lower portion of a mixing tube. A baffle face may at least partially frame a mixing tube. A baffle face may continuous or may be discontinuous. The baffle face may be integral with a mixing tube. A portion of a baffle face may form one or more sidewalls of a mixing tube. A baffle face may project from a mixing tube. A baffle face be substantially planar and/or nonplanar. Nonplanar may mean having one or more arcuate contours. A baffle face may be comprised of a single layer or multiple layers of material. The baffle face may have a cross-sectional shape which is partially or substantially circular, rectangular, triangular, ovular, squared, rhombused, oblong (e.g., rounded rectangle), the like, or any combination thereof. cross-sectional shape may be taken perpendicular to a flow axis of the reactor tube. For example, the baffle face may have a planar, half-circle 2-dimensional shape. A baffle face may include a plurality of openings, may be affixed to a flow diverter, or both. The baffle face may include a plurality of openings configured to allow an exhaust stream to pass therethrough.

A static mixer may include a flow diverter. A flow diverter may function to guide flow of an exhaust stream toward a fluid delivery device, mixer (e.g., radial, swirler), mixing tube aperture, or combination thereof. A flow diverter may have any shape and/or configuration to guide an exhaust stream to guide the exhaust stream. A flow diverter may be affixed to and/or integral with a mixing tube, a baffle face, or both. A flow diverter may be located adjacent to a mixing tube and/or within a reactor portion. A flow diverter may originate at one or more edges of a baffle face. A flow diverter may angle away from a baffle face and/or mixing tube. A flow diverter may angle toward and/or away from a flow axis. A flow diverter may be one or more flanges extending away from a baffle face. A flow diverter may be created at an edge of a baffle face closest toward a mixing tube aperture. A flow diverter may have one or more angles. A flow diverter may include a guiding flange and a stop flange. A guiding flange may be located between and integral with the stop flange and the baffle face. A guiding flange may be transverse to the baffle face and the stop flange. A guiding flange may form an angle with the baffle face, longitudinal axis of a mixing tube, longitudinal axis of a reactor portion, the like, or a combination thereof. A guiding flange may be about 5° or greater, about 10° or greater, about 20° or greater, about 30° or greater, or even about 40° or greater relative to a baffle face, longitudinal axis of a mixing tube, or both. A guiding flange may be about 90° or less, about 80° or less, about 70° or less, or even about 60° or less relative to a baffle face, longitudinal axis of a mixing tube, or both. A guiding flange may extend at an angle relative to the longitudinal axis of a reactor portion which is complementary to the angle formed with the mixing tube, longitudinal axis of a mixing tube, or both. A stop flange may form an angle with the baffle face, longitudinal axis of a mixing tube, longitudinal axis of a reactor portion, the like, or a combination thereof. The stop flange may form an angle of about 140 degrees or less, about 120 degrees or less, about 110 degrees or less, or even about 100 degrees or less. The stop flange may form an angle of about 30 degrees or greater, about 40 degrees or greater, about 50 degrees or greater, about 60 degrees or greater, about 70 degrees or greater, or even about 80 degrees or greater. The stop flange may extend toward an interior wall of a reactor portion, contact an interior wall of a reactor portion, or both. A flow diverter may compensate for the cross-sectional area that a baffle face and/or mixing tube does not cover, such that an entire cross-section blocked by at least one portion of a mixing baffle. A flow diverter may have a width equal to or greater than a mixing tube aperture. Width may be measured substantially parallel with a flow axis of a reactor portion. A flow diverter may be located directly adjacent to the mixing tube aperture, at least in partial contact with an interior surface of a reactor portion, or both. A flow diverter may be comprised of solid material, free of openings. A flow diverter may be configured to direct a flow of the exhaust stream toward the outer tube, transverse to the longitudinal axis of a reactor portion, or both.

A static mixer may include a plurality of openings. The openings may allow a flow of an exhaust stream through the static mixer, into a mixing tube, into a reactor portion, or any combination thereof. The one or more openings may be located in the one or more baffle faces, mixing tubes, or both. A baffle face may have about an equal to, larger, and/or smaller density of openings (size of openings and quantity in the surface area) as a mixing tube. A baffle face may have a smaller density of openings as compared to a mixing tube to encourage the exhaust stream to enter into the mixing. A baffle face may have a same and/or larger density of openings as compared to a mixing tube to promote the flow of the exhaust stream at a desired flow rate through the reactor portion and/or apparatus. The one or more openings may be configured to direct flow into and/or out of the mixer. One or more openings may include one or more outgoing openings, passthrough openings, or both. One or more passthrough openings may be openings formed in the baffle face. One or more outgoing openings may include openings formed in one or more sidewalls of a mixing tube, such as a lower portion of the mixing tube.

The reactor portion may include a mixing tube aperture. A mixing tube aperture ("aperture") may allow for a mixing tube to pass therethrough, allow for mixing with a reductant to occur at least partially outside of a reactor portion, allow for assembly of portions of a mixing tube, or any combination thereof. The aperture may be formed in a wall of a reactor portion. The aperture may be formed in a sidewall of a reactor portion. The aperture may have a shape which allows one or more portions of a mixing tube, outer tube, or both to pass therethrough. The aperture may have a shape similar to, reciprocal with, or varying from a shape or cross-sectional shape of a mixing tube, outer tube, or both. The aperture may have a shape substantially reciprocal with a portion of a mixing tube, such as the upper portion. The aperture may be located along a same plane and/or axis as where a flow pipe meets a reactor portion. The aperture may be located opposite a delivery device. The aperture may have an outer tube passing therethrough or adjacent thereto. The mixing tube aperture may allow for one or more outer tubes, mixing tubes, gaps, or any combination thereof to be in fluid communication with an interior of a reactor portion.

The apparatus may include one or more outer tubes. The one or more outer tubes may function to receive an incoming exhaust stream, receive an incoming untreated exhaust stream, create a flow gap with one or more mixing tubes, retain a mixing device, or any combination thereof. One or more outer tubes may have any size and/or shape to cooperate with one or more mixing baffles, apertures, mixing tubes, swirlers, caps, heat shields, fluid delivery devices, the like, or a combination thereof. The one or more outer tubes may have a shape which is partially or substantially a cylinder, cube, prism, pyramid, sphere, cone, ellipsoid, ovoid, the like, or a combination thereof. The one or more outer tubes may have a cross-sectional shape which is partially or substantially circular, rectangular, triangular, ovular, squared, rhombused, oblong (e.g., rounded rectangle), the like, or any combination thereof. A cross-section shape may be the shape substantially perpendicular to a flow within the outer tube. The one or more outer tubes may have a shape at least partially reciprocal with all or a part of one or more mixing tubes, heat shields, or both. One or more outer tubes may be located between an exterior side wall of a reactor portion and a fluid delivery device, adjacent and/or about one or more mixing tubes, about a swirler, or any combination thereof. One or more outer tubes may project from an exterior of a reactor portion. One or more outer tubes may extend from a reactor portion to a tube cap. One or more outer tubes may extend along all or a portion of a length of a mixing tube located outside of a reactor portion. For example, the outer tube may extend the entire length of an upper portion of a mixing tube which protrudes outsides of the reactor portion. An outer tube may have a cross-sectional area larger than that of a mixing tube to create a flow gap ("gap"). An outer tube may have a diameter larger than an upper portion of a mixing tube. An interior surface of the outer tube may be distanced from and not in direct contact with an exterior surface of an upper portion of a mixing tube. The distance may create flow gap ("gap") which is able to receive and guide an untreated exhaust stream therethrough toward a mixer (e.g., radial mixer, swirler). The end of the outer tube may be distanced from an end of a mixing tube. For example, the end of the outer tube may be further distanced from an exterior sidewall of a reactor portion as the end of the upper portion of the mixing tube. This distance may allow for a mixing region to be created. The mixing region may be defined by a radial mixer on one end opposing a fluid delivery device on an opposing edge. The mixing region may include a spray shield.

The apparatus may include a heat shield. A heat shield may serve as a thermal insulator. The heat shield may serve to protect components located around the outer tube, maintain heat within the outer tube, or both. The exhaust stream incoming into the outer tube from the reactor portion may have an elevated temperature. The heat from the exhaust stream may be necessary to react with the reductant. The heat shield may maintain the exhaust with elevated temperatures even after exiting a reactor portion. The heat shield may have any size and/or shape to cooperate with one or more outer tubes, mixing tubes, caps, spray shields, fluid delivery devices, or any combination thereof. The one or more heat shields may have a shape which is partially or substantially a cylinder, cube, prism, pyramid, sphere, cone, ellipsoid, ovoid, the like, or a combination thereof. The one or more heat shields may have a cross-sectional shape which is partially or substantially circular, rectangular, triangular, ovular, squared, rhombused, oblong (e.g., rounded rectangle), the like, or any combination thereof. A cross-section shape may be the shape substantially perpendicular to a flow within the outer tube, mixing tube, heat shield, or a combination thereof. The one or more heat shields may have a shape at least partially reciprocal with all or a part of one or more mixing tubes, outer tubes, or both. The one or more heat shields may have one or more openings. One or more openings may allow for a reductant to pass through. One or more heat shields may be located between an exterior side wall of a reactor portion and a fluid delivery device, adjacent and/or about an outer tube and/or spray shield, or any combination thereof. One or more heat shields may extend partially or completely from a reactor portion to a tube cap. One or more heat shields may be located around a mixing region of an outer tube. One or more heat shields may extend along all or a portion of a length of an outer tube located outside of a reactor portion. A heat shield may have a cross-sectional area, diameter, or both larger than that of an outer tube.

The apparatus may include one or more fluid delivery devices (e.g., valve, injector). The one or more fluid delivery devices may inject and/or control passage of a reductant into the apparatus, one or more mixing tubes, outer tubes, reactor portions, and/or mixers; into contact with the exhaust stream; control flow of a reductant toward a mixer; or any combination thereof. The one or more fluid delivery devices may be any suitable device for releasing and controlling passing of a reductant into the apparatus. The one or more fluid delivery devices may include a single jet and/or nozzle or a plurality of jets and/or nozzles for releasing a reductant. The one or more fluid delivery devices may include 1 or more, 2 or more, or even 3 or more jets and/or spray nozzles. The one or more fluid delivery devices may include 10 or less, 8 or less, or even 6 or less jets and/or spray nozzles. The one or more fluid delivery devices may release a reductant having a droplet size. The droplet size may range be about 5 microns or greater, about 10 microns or greater, or even about 30 microns or greater. The droplet size may be about 180 microns or less, about 150 microns or less, or even about 50 microns or less. For example, droplet size may range from about 5 microns to about 50 microns. A smaller droplet size may allow for more efficient and homogeneous mixing of the reductant with the exhaust stream. The one or more fluid delivery devices may be located in the apparatus, upstream of an ammonia slip catalyst, upstream of a selective catalytic reducer, or both. The one or more fluid delivery devices may be located upstream and/or downstream of a filter, oxidation catalyst, or both. The one or more fluid delivery devices may be connected to and/or in fluid communication outer tubes, mixing tubes, reactor portions, swirlers, spray shield, the like, or a combination thereof. A spray shield may help direct a flow of a fluid from a delivery device, prevent the flow from spraying outside of an intended delivery area, or both. A spray shield may be tapered. A spray shield may be funnel shaped. A spray shield may help guide a fluid from an injector toward a mixer, outer tube, or both. The one or more fluid delivery devices may be distanced from a reactor portion. The one or more fluid delivery devices may inject a reductant into the apparatus such that the reductant flows generally perpendicular to, parallel with, or any angle therebetween relative to a flow axis of a reactor portion, mixing tube, outer tube, the direction of flow of the exhaust stream within a reactor portion and/or mixer, or a combination thereof. The one or more fluid delivery devices may be configured to spray a reductant toward one or more outer tubes, mixing tubes, reactor portions, the like, or a combination thereof.

One or more reductants may be introduced into the exhaust stream. One or more reductants may be particularly useful in aiding one or more subsequent reactions for reducing nitrogen oxides in an exhaust stream. The one or more reductants may be introduced upstream of reducing nitrogen oxides and/or oxidizing ammonia from the exhaust stream. The one or more reductants may include an ammonia-based substance, such as an aqueous urea solution. Heat occurring in the apparatus may result in evaporation of water from the solution, resulting in urea. Heat may decompose the urea into one or more compounds. Upon decomposition, the urea may decompose into isocyanic acid and ammonia. The ammonia may be particularly useful in conjunction with a selective catalytic reactor. The one or more reductants may be introduced within a reactor portion, a mixer, or any other component in fluid communication with the exhaust stream upstream of reducing nitrogen oxides from the exhaust stream.

The one or more reactor portions may include one or more filters. The one or more filters may function to collect and/or remove particulate matter from an exhaust stream, break apart larger sizes of particulate matter into smaller particles, carry one or more catalysts, or any combination thereof. Particulate matter may include soot residing within an exhaust stream of an internal combustion engine (e.g., diesel engine). The one or more filters may collect particulate matter on one or more surfaces of the filter (e.g., surfaces created by pores). Accumulated particulate matter may be removed through active, passive, and/or forced regeneration. The one or more filters may burn off accumulated particulate matter. Burning off of particulate matter may occur through a catalyst or a burner. Exemplary filters can be found in U.S. Pat. Nos. 8,336,301, 8,763,375, 9,074,522, 9,188,039, and 9,334,785, which are incorporated herein by reference for all purposes. Suitable filters may include cordierite wall flow filters, silicon carbide wall flow filters, ceramic fiber filters, metal fiber flow-through filters, partial filters, the like, or any combination thereof. Suitable filters may include one or more diesel and/or petrol filters. The one or more filters may be located in, adjacent to, proximate with, and/or in fluid communication with one or more reactor portions. A filter may be located within a reactor portion, upstream and/or downstream of a mixer, upstream and/or downstream of a reductant, or a combination thereof. For example, one or more filters may be located between a first end region of a reactor portion and a mixer. The one or more filters may carry a catalyst (e.g., coated with a catalyst) or be free of a catalyst. The catalyst may allow a filter to also react with the exhaust stream in addition to removing particulate matter. For example, a particulate filter may also be and/or carry thereon an oxidation catalyst.

The one or more reactor portions may include or be in communication with one or more catalysts. The one or more catalysts may be configured to initiate and/or perform one or more reactions. The one or more reactor portions may function to reduce toxic gasses, toxic pollutants, greenhouse gases, or a combination thereof. Greenhouse gases may include carbon dioxide, methane, nitrous oxide, fluorinated gases, or any combination thereof. The one or more reactions may function to oxidize hydrocarbon, oxidize carbon monoxide, reduce hydrogen compounds, reduce nitrogen oxides, reduce sulfur oxides, oxidize methane, or any combination thereof. Exemplary catalysts may include a diesel oxidation catalyst (DOC), methane oxidation catalyst (MOC), selective catalytic reactor (SCR), ammonia slip catalyst (ACR), the like, or any combination thereof. The one or more catalysts may be located in one or more reactor portions, one or more flow pipes, one or more lobed chambers, or a combination thereof. The one or more catalysts may be located within the same and/or a different reactor portion as one or more other catalysts and filters. One or more catalysts may be combined with a carrier, supported on a support structure, or both. One or more filters may function as a carrier and/or support structure for a catalyst. A plurality of catalysts may be placed in any sequence within the apparatus. As one example, the diesel oxidation catalyst may be located upstream of the selective catalytic reactor and ammonia slip catalyst. As another example, the selective catalytic reactor may be located upstream of the diesel oxidation catalyst.

The one or more catalysts may include an oxidation catalyst (e.g., diesel oxidation catalyst). The oxidation catalyst may function to reduce and/or oxidize carbon monoxide and/or hydrocarbons within the exhaust stream, converting carbon monoxide and/or hydrocarbons into carbon dioxide and/or water, or both. The oxidation catalyst may be located within one or more reactor portions, filters, or both. For example, an oxidation catalyst may be integrated into a particulate filter. The oxidation catalyst may be located within one or more reactor portions upstream and/or downstream of a mixer, reductant input, or both. For example, the catalyst may be located between a first end region and mixer. The catalyst may react with the high temperature of an exhaust stream as the stream passes through a reactor portion and contacts the catalyst. Upon contact with the hot exhaust stream, the catalyst may convert the carbon monoxide and/or hydrocarbons. The oxidation catalyst may be any catalyst suitable for functioning as recited. Suitable catalysts may include palladium, platinum, rhodium, the like, or any combination thereof.

The one or more catalysts may include a selective catalytic reactor. The selective catalytic reactor may function to reduce nitrogen oxides (NOx) present within the exhaust stream, convert nitrogen oxides into nitrogen and/or water, or a combination of both. The selective catalytic reactor may be located within one or more reactor portions, filters, or both. The selective catalytic reactor portion may be located downstream of an introduction point of one or more reductants into the apparatus and/or exhaust stream. The selective catalytic reactor may be located within one or more reactor portions. The selective catalytic reactor may react with ammonia present within the exhaust stream to reduce and/or convert the nitrogen oxides. The selective catalytic reactor may be located downstream of one or more fluid delivery devices which introduce one or more reductants, one or more mixers, one or more reactor portions, or any combination thereof. A selective catalytic reactor may be any catalyst suitable for functioning as recited. Exemplary selective catalytic reactors may include one or more ceramic materials, one or more metals, one or more minerals, or a combination thereof. One or more metals may include vanadium, molybdenum, tungsten, precious metals, or any combination thereof. One or more minerals may include zeolites. The selective catalytic reactor may be located in a same or different reactor portion as an ammonia slip catalyst. The selective catalytic reactor may cooperate with an ammonia slip catalyst.

The one or more catalysts may include an ammonia slip catalyst. An ammonia slip catalyst may be useful in eliminate trace amounts of ammonia remaining within an exhaust stream. The ammonia slip catalyst may oxidize some of the ammonia present within an exhaust stream. The ammonia may be oxidized into nitrogen gas and water. The ammonia may be present after the exhaust stream mixes with one or more reductants, reacts within a selective catalytic reactor, or both. The ammonia slip catalyst may be located within one or more reactor portions, filters, or both. The ammonia slip catalyst may be located within one or more reactor portions. The ammonia slip catalyst may be located downstream of one or more fluid delivery devices which introduce one or more reductants, one or more mixers, a reactor portion; upstream of a reactor portion; or any combination thereof. The ammonia slip catalyst may be located in a same or different reactor portion as a selective catalytic reactor. The ammonia slip catalyst may be located close to an outgoing end of a reactor portion than an incoming end. For example, the ammonia slip catalyst may be located near an outgoing end of a reactor portion having a selective catalytic reactor therein. An ammonia slip catalyst may be any catalyst able to function as recited. Exemplary ammonia slip catalysts may include one or more metals. The one or more metals may include platinum, palladium, or a mixture thereof. The ammonia slip catalyst may react with remnants of ammonia resulting from one or more reductants.

The present teachings relate to a method of treating an exhaust stream. The stream may result from internal combustion of a transportation vehicle. The method may utilize the apparatus according to the teachings herein. The method may include a) flowing an untreated exhaust stream through a reactor portion such that a direction of the untreated exhaust stream is substantially parallel to a longitudinal axis of the reactor portion; b) diverting a portion of the untreated exhaust stream transverse to the longitudinal axis and through a mixing tube aperture such that the portion of the untreated exhaust stream exits the reactor portion; c) passing the portion of the untreated exhaust stream through a gap between a mixing tube and an outer tube; d) passing the portion of the untreated exhaust stream through a swirler causing a turbulent flow after exiting the gap; e) spraying a reductant from an injector into the portion of the untreated exhaust stream; f) mixing the reductant with the turbulent flow of the untreated exhaust stream and creating a mixed exhaust stream; g) redirecting the mixed exhaust stream to flow through the mixing tube in a substantially opposite and parallel direction as the portion of the untreated exhaust stream; and h) deflecting the mixed exhaust stream to exit the mixing tube.

Illustrative Examples

Figure 1:
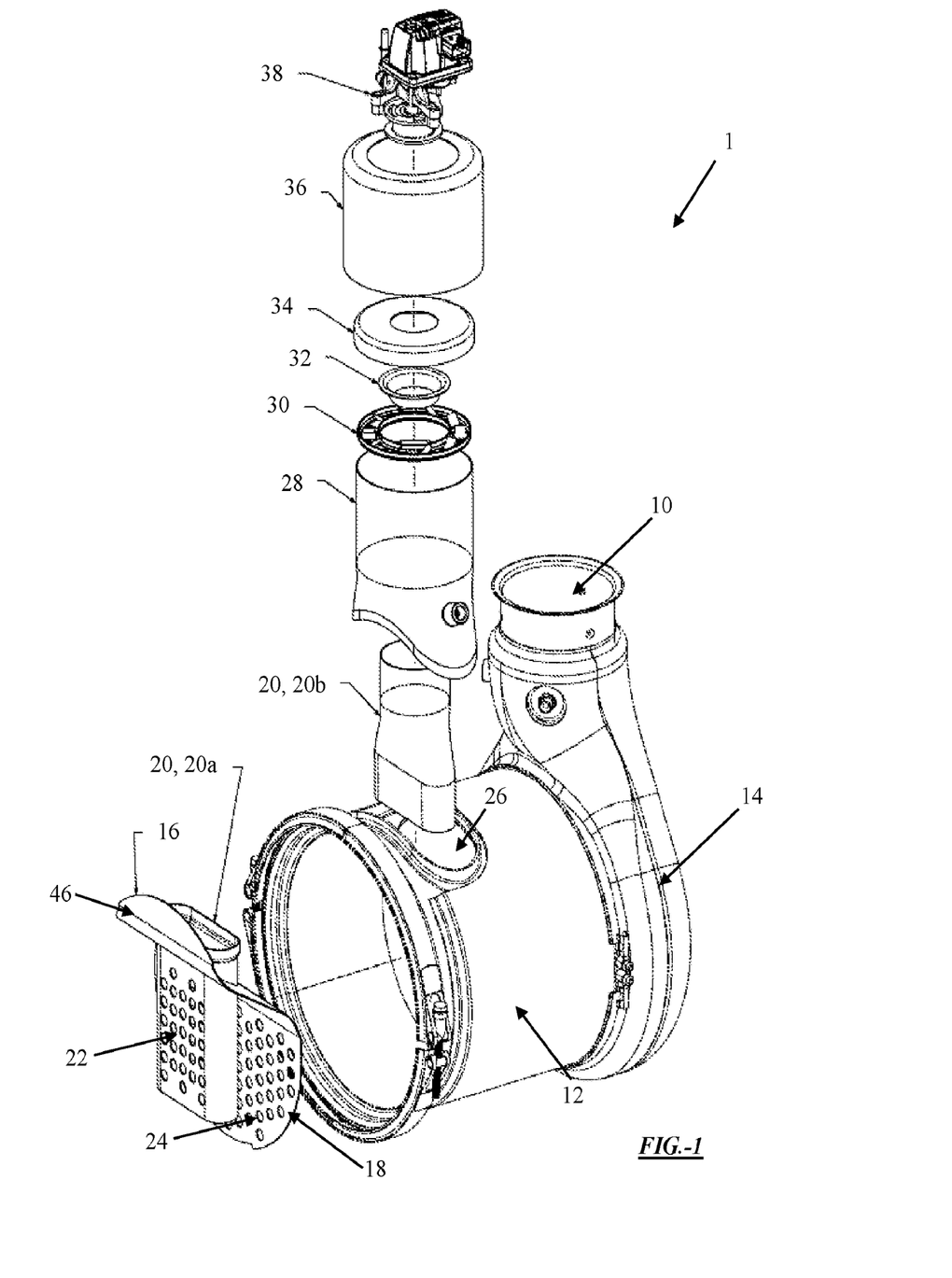
FIG. 1 is an exploded view of an exhaust aftertreatment apparatus.

FIG. 1 illustrates an exhaust aftertreatment apparatus 1 (also referred to as "apparatus"). The apparatus 1 includes an inlet pipe 10. The inlet pipe 10 leads into a reactor portion 12. Between the reactor portion 12 and inlet pipe 10 is an end cap 14. Located within the reactor portion 12 and downstream of the end cap 14 is a mixing baffle 16. The mixing baffle 16 includes a baffle face 18. The mixing baffle 16 includes a flow diverter 46. The mixing baffle 16 includes a lower portion 20a of the mixing tube 20. The mixing tube 20 includes a plurality of outgoing openings 22. The baffle face 18 includes a plurality of passthrough openings 24. The reactor portion 12 includes a mixing tube aperture 26. The upper portion 20b of the mixing tube 20 passes through the mixing tube aperture 26 to mate with the lower portion 20a. Located about the mixing tube 20 is an outer tube 28. A gap is created between the inside surface of the outer tube 28 and the mixing tube 20. Located in the gap between the outer tube 28 and the mixing tube 20 is a swirler 30. The swirler 30 is also located about the mixing tube 20. Located above the mixing tube 20 and the swirler 30 is a spray shield 32. A tube cap 34 retains the spray shield 32 and seals the outer tube 28. Located about the outer tube 28 and the tube cap 34 is a heat shield 36. In fluid communication with the mixing tube 20 is an injector 38. The reactor portion 12 includes a clamp 40.

Figure 2:
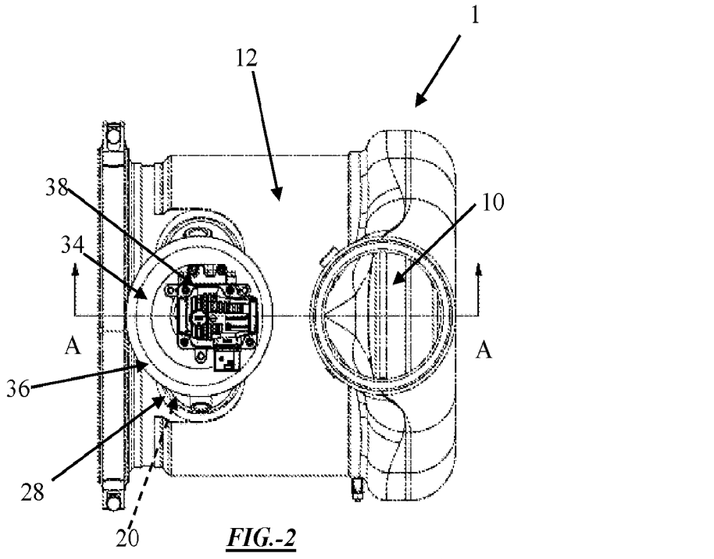
FIG. 2 is a top plan view of an exhaust aftertreatment apparatus.

FIG. 2 illustrates a top view of an exhaust aftertreatment apparatus 1. The apparatus 1 includes an inlet pipe 10. The inlet pipe 10 is in fluid communication with a reactor portion 12. The reactor portion 12 is in fluid communication with an injector 38 via a mixing tube 20. The inlet pipe 10 and mixing tube 20 extend from the reactor portion 12 substantially parallel to one another in the same direction.

Figure 3:
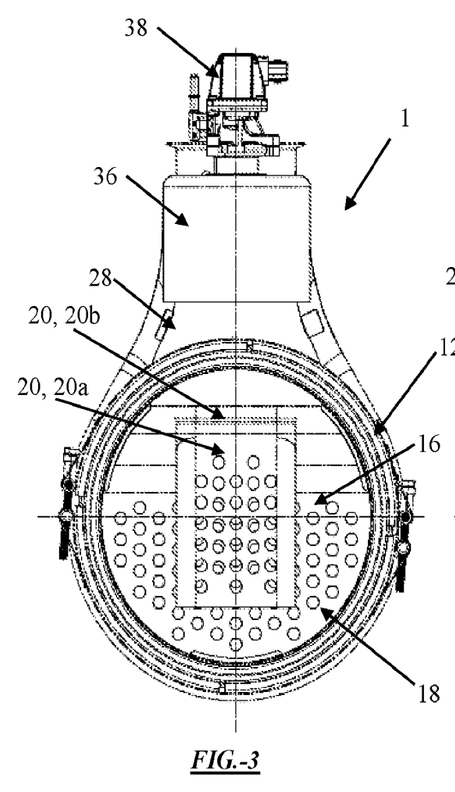
FIG. 3 is a front plan view of an exhaust aftertreatment apparatus.

FIG. 3 illustrates a front view of the exhaust aftertreatment apparatus 1. The apparatus 1 includes a reactor portion 12. Located within the reactor portion 12 is a mixing baffle 16. The mixing baffle 16 includes a baffle face 18. The mixing baffle 16 includes a mixing tube 20. In fluid communication with and receiving the mixing tube 20 is an outer tube 28. Located about the outer tube 28 is a heat shield. In fluid communication with the mixing tube 20 is an injector 38.

Figure 4:
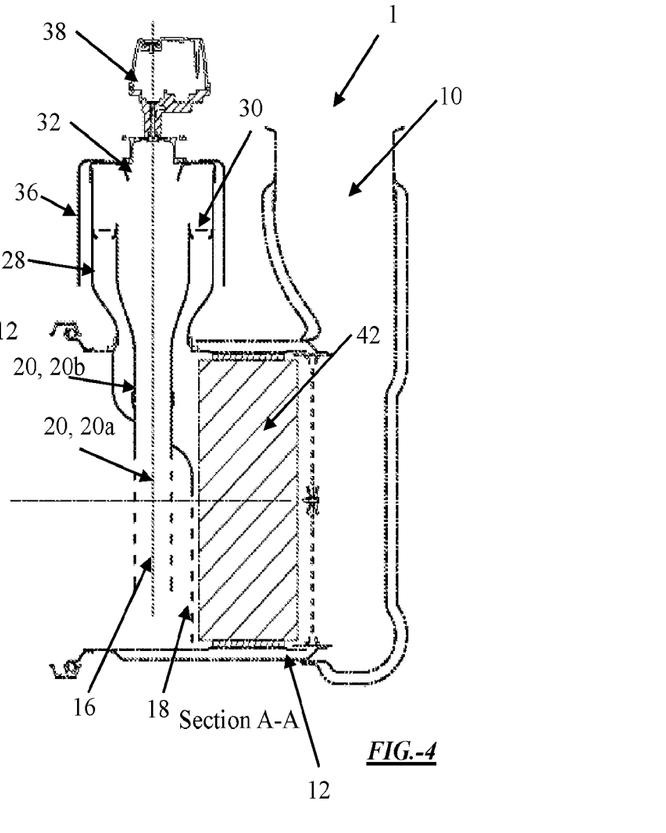
FIG. 4 is a cross-section view of an exhaust aftertreatment apparatus along section A-A of FIG. 2.

FIG. 4 illustrates a cross-section along section A-A of FIG. 2. The apparatus 1 includes an inlet pipe 10. The inlet pipe 10 is in fluid communication with a reactor portion 12.

The reactor portion 12 includes a filter/catalyst 42. Located within the reactor portion 12 is a mixing baffle 16. The mixing baffle 16 includes a baffle face 18 and a mixing tube 20. Thus, the mixing baffle 16 is in fluid communication with the reactor portion 12. The mixing baffle 16 is also in fluid communication with an injector 38. The injector 38 is aligned with the lower portion 20a of the mixing tube 20 via the upper portion 20b and outer tube 28. Located between the mixing tube 20 and the outer tube 28 is a swirler 30. Located opposite the end of the mixing tube 20 is a spray shield 32. Located about the outer tube 28 is a heat shield 36.

Figure 5:
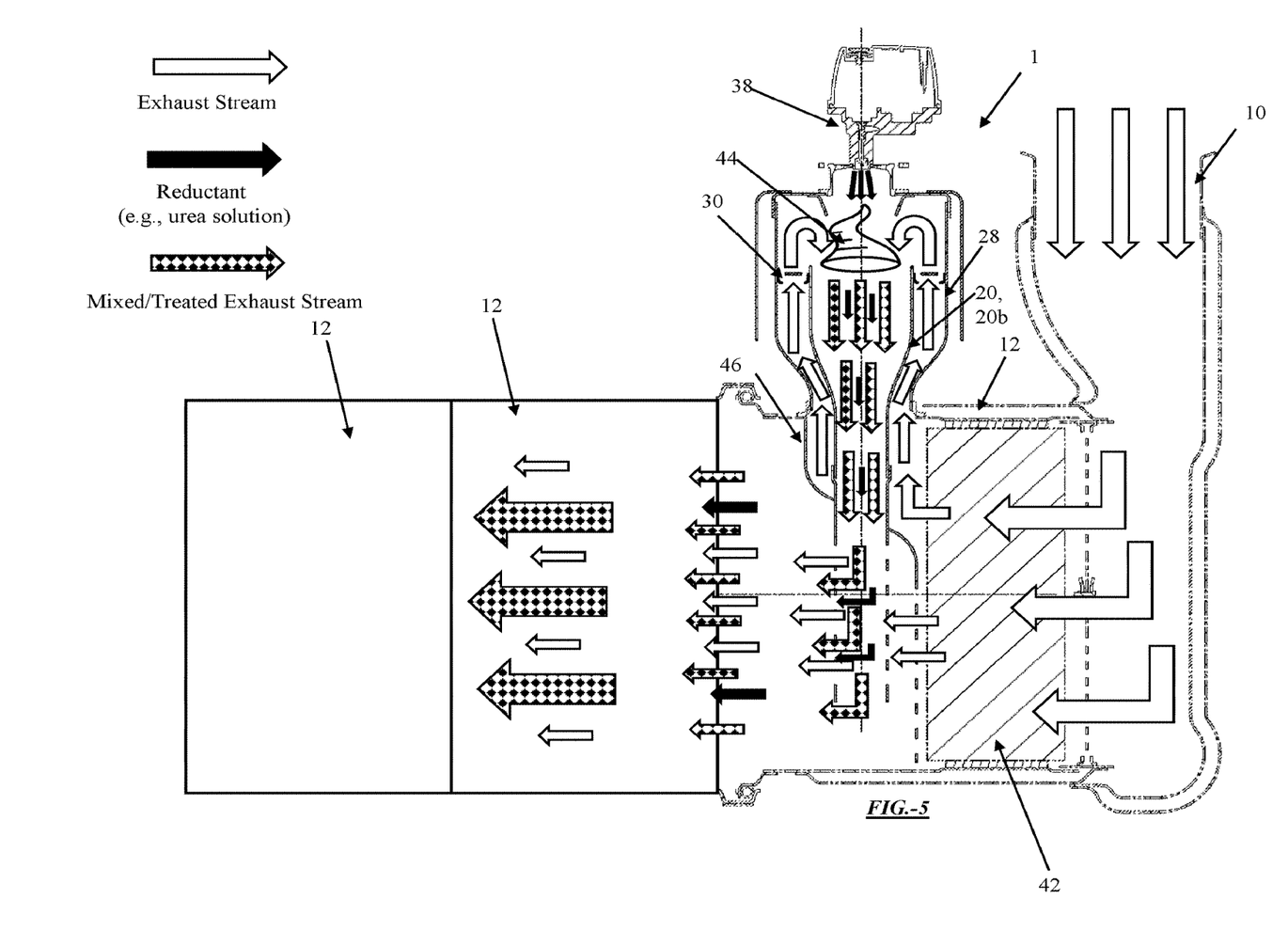
FIG. 5 illustrates a path of an exhaust stream flowing through an exhaust aftertreatment apparatus.
Figure 6:
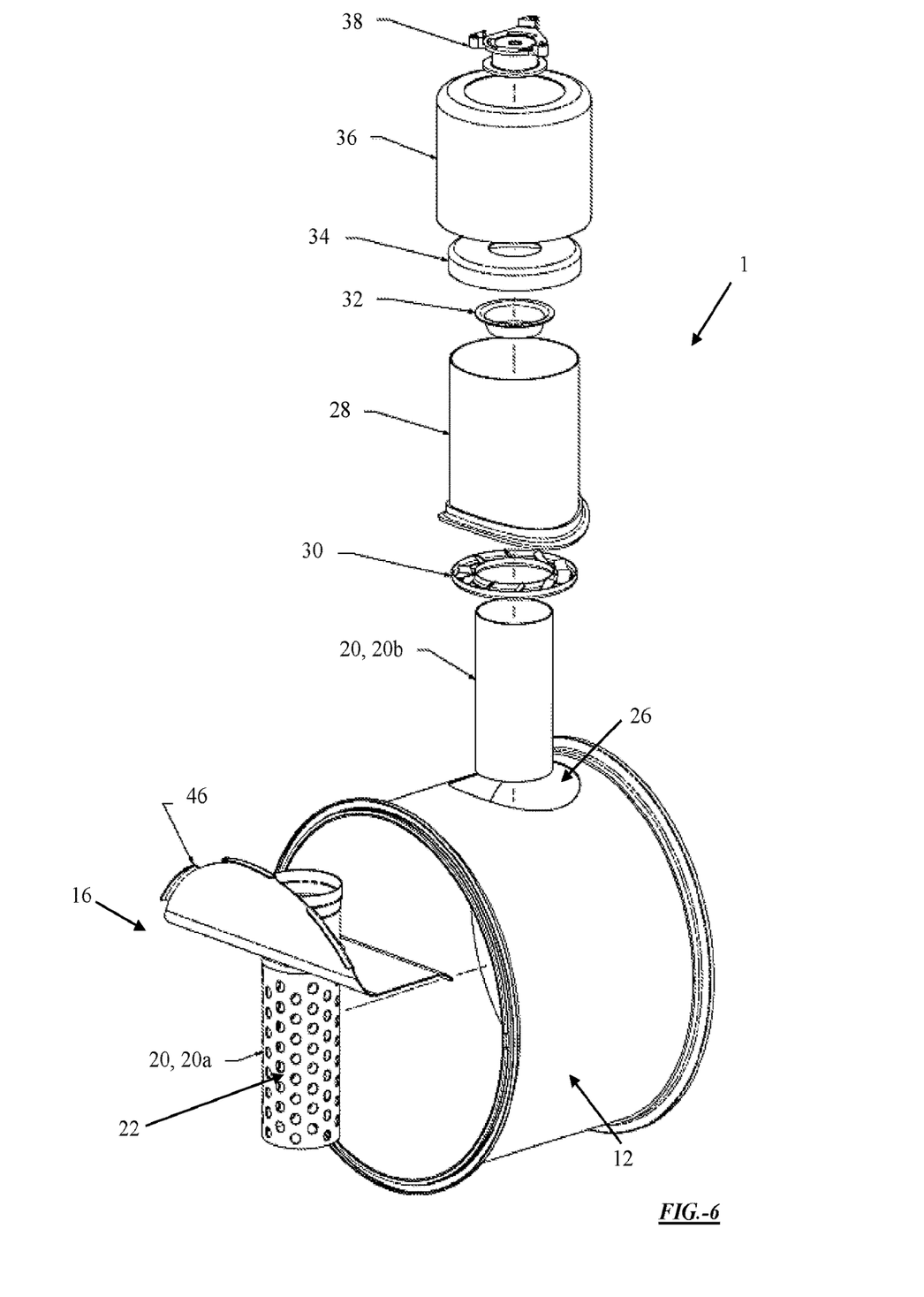
FIG. 6 is an exploded view of an exhaust aftertreatment apparatus.
Figure 7:
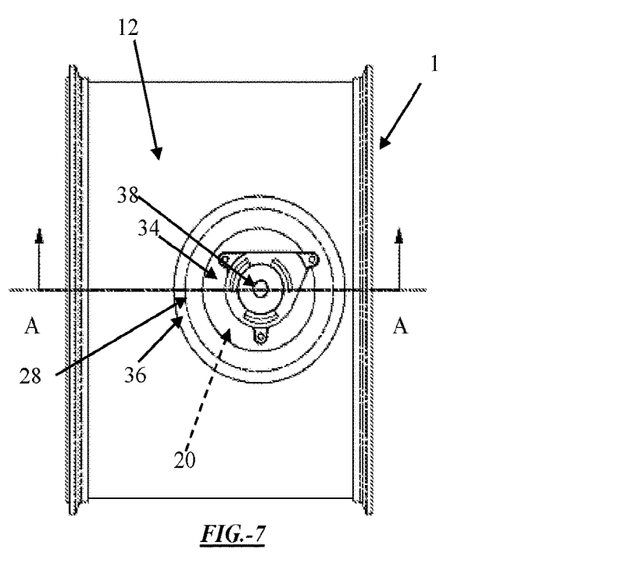
FIG. 7 is a top plan view of an exhaust aftertreatment apparatus.
Figure 8:
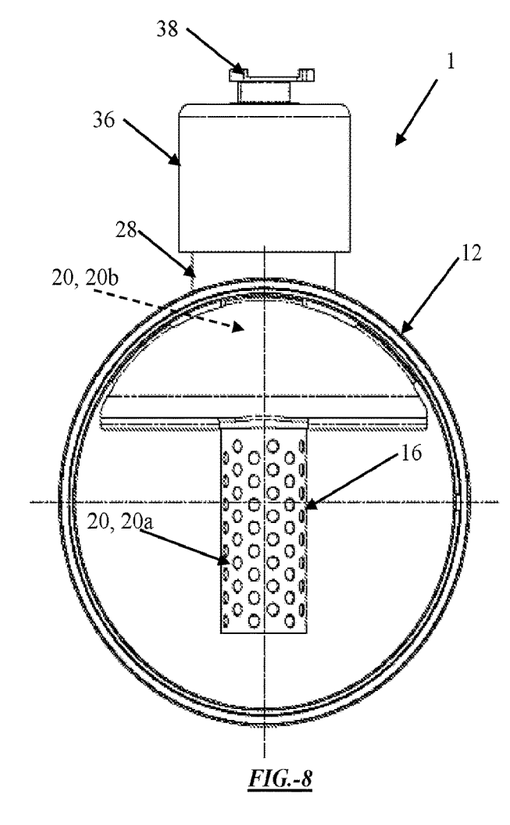
FIG. 8 is a front plan view of an exhaust aftertreatment apparatus.
Figure 9:
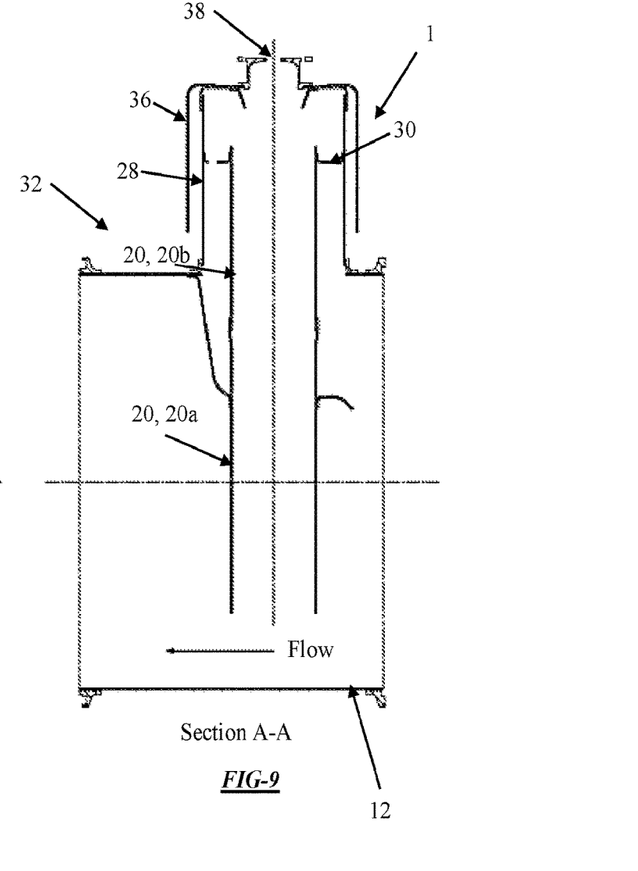
FIG. 9 is a cross-section view of an exhaust aftertreatment apparatus along section A-A of FIG. 7.

FIG. 5 illustrates a path of an exhaust stream flowing through an exhaust aftertreatment apparatus, such as that illustrated in FIG. 4. An exhaust stream enters the apparatus 1 through the inlet pipe 10. The exhaust stream moves from the inlet pipe 10 to the reactor portion 12. The exhaust stream may pass through a filter/catalyst 42. Some of the exhaust stream may pass through a plurality of outgoing openings 22 and/or passthrough openings 24 and enter pass through to a subsequent reactor portion 12. Some of the exhaust stream may be directed upward between the mixing tube 20 and the outer tube 28. A flow diverter 46 may aid in directing a flow of the exhaust stream toward the outer tube 28. After entering the outer tube 28, the exhaust stream may pass through a swirler 30. The swirler 30 may create a turbulent (e.g., vortex) flow 44. An injector 38 sprays a reductant into the turbulent flow 44. The reductant mixes with some of the exhaust stream to provide for a mixed exhaust stream. The mixed exhaust stream and some of the unmixed reductant flow through the mixing tube 20, continuing to mix. The treated exhaust stream and any remaining unmixed reductant flow exit the mixing tube 20 via a plurality of outgoing openings 22. The mixed exhaust stream may then pass through one or more subsequent reactor portions 12.

FIGS. 6-9 illustrate an exhaust aftertreatment apparatus 1 (also referred to as "apparatus"). In this example, the mixing baffle 16 is free of a baffle face 18 (such as shown in FIG. 1). The apparatus 1 includes a reactor portion 12. Located within the reactor portion 12 is a mixing baffle 16. The mixing baffle 16 includes a flow diverter 46. The mixing baffle 16 includes a lower portion 20a of the mixing tube 20. The mixing tube 20 includes a plurality of outgoing openings 22. The reactor portion 12 includes a mixing tube aperture 26. The upper portion 20b of the mixing tube 20 passes through the mixing tube aperture 26 to mate with the lower portion 20a. Located about the mixing tube 20 is an outer tube 28. A gap is created between the inside surface of the outer tube 28 and the mixing tube 20. Located in the gap between the outer tube 28 and the mixing tube 20 is a swirler 30. The swirler 30 is also located about the mixing tube 20. Located above the mixing tube 20 and the swirler 30 is a spray shield 32. A tube cap 34 retains the spray shield 32 and seals the outer tube 28. Located about the outer tube 28 and the tube cap 34 is a heat shield 36. In fluid communication with the mixing tube 20 is an injector 38.

REFERENCE NUMBER LISTING

1—Exhaust aftertreatment apparatus, 10—Inlet pipe, 12—Reactor portion, 14—End cap, 16—Mixing baffle, 18—Baffle face, 20—Mixing tube, 20a—Lower portion of mixing tube, 20b—Upper portion of mixing tube, 22—Outgoing openings, 24—Passthrough openings, 26—Mixing tube aperture, 28—Outer tube, 30—Swirler, 32—Spray shield, 34—Tube cap, 36—Heat shield, 38—Injector, 40—Clamp, 42—Filter/Catalyst, 44—Turbulent (e.g., vortex) flow, 46—Flow diverter.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints.

The terms "generally" or "substantially" to describe angular measurements may mean about +/−100 or less, about +/−50 or less, or even about +/−10 or less. The terms "generally" or "substantially" to describe angular measurements may mean about +/−0.010 or greater, about +/−0.10 or greater, or even about +/−0.50 or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:
1. An exhaust aftertreatment apparatus comprising:
a) a reactor portion which is tubular and has a flow axis parallel with a longitudinal axis of the reactor portion, wherein the reactor portion is configured to receive an exhaust stream in a first end region, wherein the reactor portion includes a mixing tube aperture;
b) a mixer located within the reactor portion and located downstream of the first end region, wherein the mixer includes at least a lower portion of a mixing tube integrally formed therewith, wherein the lower portion of the mixing tube includes a plurality of openings formed in one or more side walls and extends at an angle transverse to the longitudinal axis of the reactor portion;
c) an upper portion of the mixing tube separately formed from the lower portion and which extends through the mixing tube aperture of the reactor portion and mates with the lower portion of the mixing tube, wherein the one or more side walls of the upper portion are free of openings;

d) an outer tube located about at least the upper portion of the mixing tube and projecting from an exterior of the reactor portion; and e) an injector in fluid communication with the outer tube and the mixing tube and distanced from the reactor portion, wherein the injector is configured to spray a reductant toward the outer tube and the mixing tube;

wherein a flow diverter is located adjacent to the mixing tube and within the reactor portion, and wherein the flow diverter is configured to direct a flow of the exhaust stream toward the outer tube and the injector and transverse to the longitudinal axis;

wherein an exterior periphery of the upper portion of the mixing tube is distanced from an interior of the outer tube through which it passes thus creating a gap, wherein the gap is configured to receive the exhaust stream from the reactor portion; and wherein an end of the outer tube closest to the injector is distanced from an end of the upper portion of the mixing tube closest to the injector to form a mixing region and which receives the exhaust stream from the gap, and the upper portion of the mixing tube is configured to receive the exhaust stream and the reductant after passing through the mixing region.

2. The exhaust aftertreatment apparatus of claim 1, wherein the first end region includes an inlet pipe in fluid communication with the reactor portion.

3. The exhaust aftertreatment apparatus of claim 2, wherein the inlet pipe is at an angle transverse to the longitudinal axis or parallel with the longitudinal axis of the reactor portion.

4. The exhaust aftertreatment apparatus of claim 1, wherein the reactor portion includes a filter, a catalyst, or both located within an interior of the reactor portion.

5. The exhaust aftertreatment apparatus of claim 4, wherein the filter, the catalyst, or both are located between the first end region and the mixer.

6. The exhaust aftertreatment apparatus of claim 1, wherein the lower portion of the mixing tube is at least partially surrounded and/or framed by a baffle face; and
wherein the baffle face is integrally formed with the lower portion of the mixing tube.

7. The exhaust aftertreatment apparatus of claim 6, wherein the baffle face includes a plurality of pass through openings in a portion of the baffle face located within the reactor portion and the plurality of pass through openings are configured to allow the exhaust stream to pass therethrough.

8. The exhaust aftertreatment apparatus of claim 1, wherein the gap is in fluid communication with an interior of the reactor portion via the mixing tube aperture.

9. The exhaust aftertreatment apparatus of claim 1, wherein a swirler is located between the outer tube and the upper portion of the mixing tube in the mixing region.

10. The exhaust aftertreatment apparatus of claim 9, wherein the swirler is configured to create a turbulent flow of the exhaust stream passing therethrough.

11. The exhaust aftertreatment apparatus of claim 9, wherein the swirler is positioned such that the exhaust stream passes through the swirler prior to coming in contact with the reductant.

12. The exhaust aftertreatment apparatus of claim 1, wherein a heat shield is located about the outer tube.

13. The exhaust aftertreatment apparatus of claim 1, wherein a spray shield is located adjacent to the injector and within the outer tube.

14. A method for treating the exhaust stream according to claim 1, the exhaust stream resulting from internal combustion of a transportation vehicle comprising:

a) flowing an untreated exhaust stream through the reactor portion such that a direction of the untreated exhaust stream is parallel to the longitudinal axis of the reactor portion;

b) diverting a portion of the untreated exhaust stream transverse to the longitudinal axis and through the mixing tube aperture such that the portion of the untreated exhaust stream exits the reactor portion;

c) passing the portion of the untreated exhaust stream through the gap between the upper portion of the mixing tube and the outer tube;

d) passing the portion of the untreated exhaust stream through a swirler causing a turbulent flow after exiting the gap;

e) spraying the reductant from the injector into the portion of the untreated exhaust stream;

f) mixing the reductant with the turbulent flow of the untreated exhaust stream and creating a mixed exhaust stream;

g) redirecting the mixed exhaust stream to flow through the upper portion and then the lower portion of the mixing tube in an opposite and parallel direction as the portion of the untreated exhaust stream; and h) deflecting the mixed exhaust stream to exit the mixing tube.

15. An exhaust aftertreatment apparatus comprising:

a) a reactor portion which is tubular and has a flow axis parallel with a longitudinal axis of the reactor portion, wherein the reactor portion is configured to receive an exhaust stream in a first end region, wherein the reactor portion includes a mixing tube aperture;

b) a mixer located within the reactor portion and located downstream of the first end region, wherein the mixer includes at least a lower portion of a mixing tube integrally formed therewith, wherein the lower portion of the mixing tube includes a plurality of openings formed in one or more side walls, and wherein the lower portion extends at an angle transverse to the longitudinal axis of the reactor portion;

c) an upper portion of the mixing tube separately formed from the lower portion and which extends through the mixing tube aperture of the reactor portion and mates with the lower portion of the mixing tube, wherein one or more side walls of the upper portion are free of openings;

d) an outer tube located about at least the upper portion of the mixing tube and projecting from an exterior of the reactor portion; and e) an injector in fluid communication with the outer tube and the mixing tube and distanced from the reactor portion, wherein the injector is configured to spray a reductant toward the outer tube and the mixing tube;

wherein a flow diverter is integrally formed as part of the mixer and is located adjacent to the mixing tube and within the reactor portion, and wherein the flow diverter is configured to direct a flow of the exhaust stream toward the outer tube and the injector and transverse to the longitudinal axis;

wherein the mixer includes a baffle face which at least partially surrounds and/or frames the lower portion of the mixing tube;

wherein the baffle face includes a plurality of pass through openings in a portion of the baffle face located within the reactor portion, and the plurality of pass through openings are configured to allow the exhaust stream to pass therethrough;

wherein an exterior periphery of the upper portion of the mixing tube is distanced from an interior of the outer tube through which it passes thus creating a gap, wherein the gap is configured to receive the exhaust stream from the reactor portion;

wherein an end of the outer tube closest to the injector is distanced from an end of the upper portion of the mixing tube closest to the injector to form a mixing region and which receives the exhaust stream from the gap, and the mixing tube is configured to receive the exhaust stream and the reductant after passing through the mixing region; and wherein a swirler is located between the outer tube and the upper portion of the mixing tube in the mixing region.

16. The exhaust aftertreatment apparatus of claim 15, wherein the swirler is configured to create a turbulent flow of the exhaust stream passing therethrough.

17. The exhaust aftertreatment apparatus of claim 15, wherein the swirler is positioned such that the exhaust stream passes through the swirler prior to coming in contact with the reductant.

18. The exhaust aftertreatment apparatus of claim 15, wherein the baffle face is upstream of the mixing tube.

19. The exhaust aftertreatment apparatus of claim 15, wherein a heat shield is located about the outer tube.

20. The exhaust aftertreatment apparatus of claim 15, wherein the reactor portion includes a filter, a catalyst, or both located between the first end region and the mixer.

* * * * *